US008917616B2

(12) United States Patent
Todd et al.

(10) Patent No.: US 8,917,616 B2
(45) Date of Patent: Dec. 23, 2014

(54) METHODS AND APPARATUS FOR DETECTION OF A NAT DEVICE

(75) Inventors: Michael Todd, Rocklin, CA (US); Patrick Choy Ming Wong, Scotts Valley, CA (US); Matthew Richard Thomas Hall, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 54 days.

(21) Appl. No.: 13/260,162

(22) PCT Filed: Oct. 28, 2009

(86) PCT No.: PCT/US2009/062323
§ 371 (c)(1),
(2), (4) Date: Dec. 15, 2011

(87) PCT Pub. No.: WO2011/053284
PCT Pub. Date: May 5, 2011

(65) Prior Publication Data
US 2012/0113841 A1    May 10, 2012

(51) Int. Cl.
*H04L 12/26* (2006.01)
*H04L 29/12* (2006.01)

(52) U.S. Cl.
CPC ...... *H04L 61/2514* (2013.01); *H04L 29/12367* (2013.01); *H04L 43/18* (2013.01)
USPC .......................... 370/252; 370/465; 370/475

(58) Field of Classification Search
USPC .......... 370/229, 230, 235, 252, 400, 465–475
See application file for complete search history.

(56) References Cited

U.S. PATENT DOCUMENTS

| | | | |
|---|---|---|---|
| 7,568,224 B1 * | 7/2009 | Jennings et al. | 726/14 |
| 7,599,365 B1 * | 10/2009 | Sabol et al. | 370/389 |
| 2006/0146813 A1 | 7/2006 | Biswas et al. | |
| 2007/0258452 A1 | 11/2007 | Shimizu et al. | |
| 2008/0072305 A1 * | 3/2008 | Casado et al. | 726/11 |
| 2009/0037353 A1 | 2/2009 | Greenwald et al. | |
| 2009/0175197 A1 | 7/2009 | Nechushtan et al. | |
| 2009/0182864 A1 * | 7/2009 | Khan et al. | 709/224 |
| 2010/0161795 A1 * | 6/2010 | Deridder et al. | 709/224 |

OTHER PUBLICATIONS

PCT; "Notification of Transmittal of the International Search Report and the Written Opinion of the International Searching Authority, or the Declaration" in PCT/US2009/062323; mailed Jul. 26, 2010; 9 pages.
Phaal, P.; "Detecting NAT Devices using sFlow"; http://www.sflow.org/detectNAT/; 3 pages, May 12, 2003.

* cited by examiner

*Primary Examiner* — Ricky Ngo
*Assistant Examiner* — Wei-Po Kao (57) ABSTRACT

A method for detection of a network address translation (NAT) device in a network is described herein. An edge network device detects a first packet at an edge port of the edge network device. A second packet is detected at the edge port of the edge network device. It is determined whether a time to live (TTL) value associated with the first packet is different from a TTL value associated with the second packet. Where the TTL value associated with the first packet is different from a TTL value associated with the second packet, it is determined that a NAT device is connected to the edge port. Where the TTL value associated with the first packet is the same as a TTL value associated with the second packet, it is determined that a NAT device is not connected to the edge port.

11 Claims, 6 Drawing Sheets

METHODS AND APPARATUS FOR DETECTION OF A NAT DEVICE

I. BACKGROUND

A Network Address Translation (NAT) device is commonly used in Internet Protocol (IP) translation and mapping technology. These devices are often used to allow multiple users to gain access to a network via one address. A gateway may map many IP addresses on one side of the NAT device to one IP address (or a small number of IP addresses) on the other side. Using this mapping, a number of hosts each associated with an IP address may exist behind one NAT device, and their network traffic is seen on the other side of the NAT device as coming from a single IP address (or a small number of IP addresses).

The existence of NAT devices on a network has been a challenge to network and security administrators, as it can potentially hide unauthorized hosts, or even entire networks from network management systems, security systems and administrators. This threat may be made more severe where the NAT device is a wireless router, which can enable a hidden host outside an organization's premise to connect to the network of the organization.

Detection of NAT devices can be difficult because they can be virtually indistinguishable from a host computer. For example, an unauthorized host may connect to the protected network via the NAT device. When the unauthorized host sends a packet to the network, the source IP address in the packet of the unauthorized host are replaced with the IP address by the NAT device. This feature of the NAT device renders the detection of the source of any dubious access or operation to or in the protected network quite difficult.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Many devices in today's networks perform network address translation. Among such NAT devices are consumer-type routers and wireless routers, end-user PC's sharing a network connection, and more. Network security systems are used today to monitor the health of a managed network, which may include NAT detection.

A NAT detection and blocking methodology is described herein which prevents unauthorized network access through unauthorized NAT devices. In one embodiment, a packet is analyzed and it is determined whether a NAT device is present in the network based on the analysis. Unauthorized NAT devices may be detected notwithstanding the ability of NAT devices to clone a network address of an authorized device thereby sidelining 802.1x and MAC address based authentication.

A method for detection of a network address translation (NAT) device in a network is described herein. An edge network device detects a first packet at an edge port of the edge network device. A second packet is detected at the edge port of the edge network device. It is determined whether a time to live (TTL) value associated with the first packet is different from a TTL value associated with the second packet. Where the TTL value associated with the first packet is different from a TTL value associated with the second packet, it is determined that a NAT device is connected to the edge port. Where the TTL value associated with the first packet is the same as a TTL value associated with the second packet, it is determined that a NAT device is not connected to the edge port.

In one embodiment, a system for detection of a network address translation (NAT) device in a network is described. The network may include one or more hosts and an edge network device. The edge network device includes a processor and a memory coupled to the processor. The processor may be configured to analyze a plurality of operating system fingerprint signatures of ingress packets at an edge port of the edge network device, determine whether the plurality of fingerprint signatures indicate that multiple operating systems share a same network address at the edge port, determine a NAT device is connected to the edge port if the plurality of fingerprint signatures map to multiple operating systems, and determine a NAT device is not connected to the edge port if the plurality of fingerprint signatures map to a single operating system.

Figure 1:
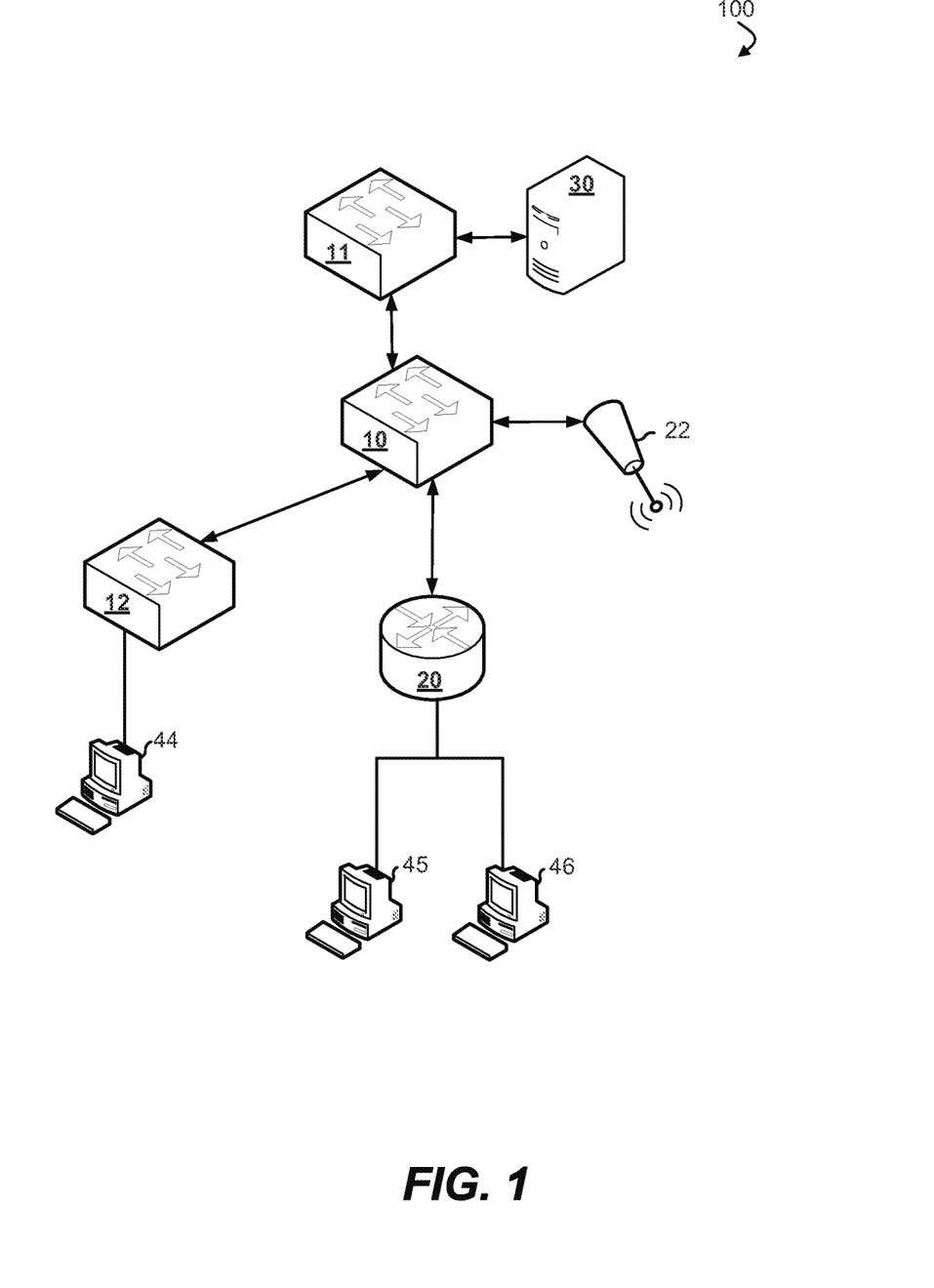
FIG. 1 is topological block diagram of a network system in accordance with an embodiment of the invention.

FIG. 1 is topological block diagram of a network 100 in accordance with an embodiment of the invention. Network 100 includes a network management server 30, a network switch 10, a network switch 11, a network switch 12, a NAT router 20, a wireless access point (AP) 22, a host 44, a host 45, and a host 46.

Network management server 30 is operatively coupled to network switch 11. The connection between network management server 30 and network switch 11 may include multiple network segments, transmission technologies and components. Network management server 30 is configured to manage, monitor, and/or deploy a network. Network management server 30 may be further configured to inspect and analyze a plurality of operating system fingerprint signatures and to detect unauthorized NAT devices in network 100 based on the analysis of the fingerprint signatures. In one embodiment, a network scanning tool such as Network Mapper (Nmap) and other active and passive network scanning tools may be used by network management server 30 to perform a scan of network 100. In other embodiments, the scan may be performed by a different entity and the results of the scan may be provided to network management server for analysis.

Network switch 11 is operatively coupled to network management server 30 and network switch 10. Network switch 10 is operatively coupled to network switch 11 and network switch 12. Network switch 10 includes multiple ports, one of which connects to wireless access point 22 and another of which connects to NAT router 20. Network switch 10 is an edge device. As used herein, an edge device is a network switch, router, or other network device on the edge of a network. Host devices connect directly to the edge device via an edge port. As used herein, an edge port is a port of an edge device which is directly connected to a host device.

Network switch 12 is an edge device and is operatively coupled to network switch 10. Network switch 12 includes multiple ports, at least one of which is an edge port that connects to host 44.

In one embodiment, network switches 10-12 are configured to process and transfer data in a network. Additionally, network switches 10-12 may be further configured to analyze a packet, such as a data packet and/or a transmission control protocol (TCP) synchronization and acknowledgement (SYN+ACK) message, and to detect unauthorized NAT devices in network 100 based on the analysis of the packets.

Wireless access point 22 is operatively coupled to network switch 10 via an edge port of network switch 10. Wireless access point 22 is configured to connect wireless communication devices to a wireless network.

NAT router 20 is operatively coupled to host 45, host 46, and network switch 10 via an edge port of network switch 10. NAT router 20 is configured to process and transfer data in network 100. Additionally, NAT router 20 is configured to map unregistered (i.e., private) network addresses for use by hosts behind NAT router 20, for example host 45 and host 46, to a registered (i.e., public) network address. For example, NAT router 20 may be configured to replace the private source network address and/or port number of packets received from host 45 and/or 46 with its own public network address and/or port number, thereby hiding the private source address of traffic from hosts 45 and/or 46.

In one embodiment, the network traffic of host 45 may be generated by a Windows® operating system. The network traffic of host 46 may be generated by a MAC® operating system. In operation, when an ingress packet is received at the edge port connected to host 45, NAT router 20 replaces the source MAC address and source IP address of host 45 in the packet with its own source MAC address and source IP address. Likewise, when an ingress packet is received at the edge port connected to host 46, NAT router 20 replaces the source MAC address and source IP address of host 46 in the packet with its own source MAC address and source IP address. As such, packets from host 45 and host 46 appear as though they originate from a single network address.

The traffic between host 45 and host 46 may be distinguished using a fingerprint signature which can be mapped to an operating system. Packets from host 45 are associated with a fingerprint signature mapped to the Windows® operating system, whereas packets from host 46 are associated with a fingerprint signature mapped to the MAC® operating system.

In one embodiment, NAT detection includes analyzing a plurality of fingerprint signatures and detecting an unauthorized NAT device based on the analysis of the fingerprint signatures. In another embodiment, NAT detection includes analyzing a packet and detecting an unauthorized NAT device based on the analysis of the packet.

The present invention can also be applied in other network topologies and environments. Network 100 may be any type of network familiar to those skilled in the art that can support data communications using any of a variety of commercially-available protocols, including without limitation TCP/IP, SNA, IPX, AppleTalk, and the like. Merely by way of example, network 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2:
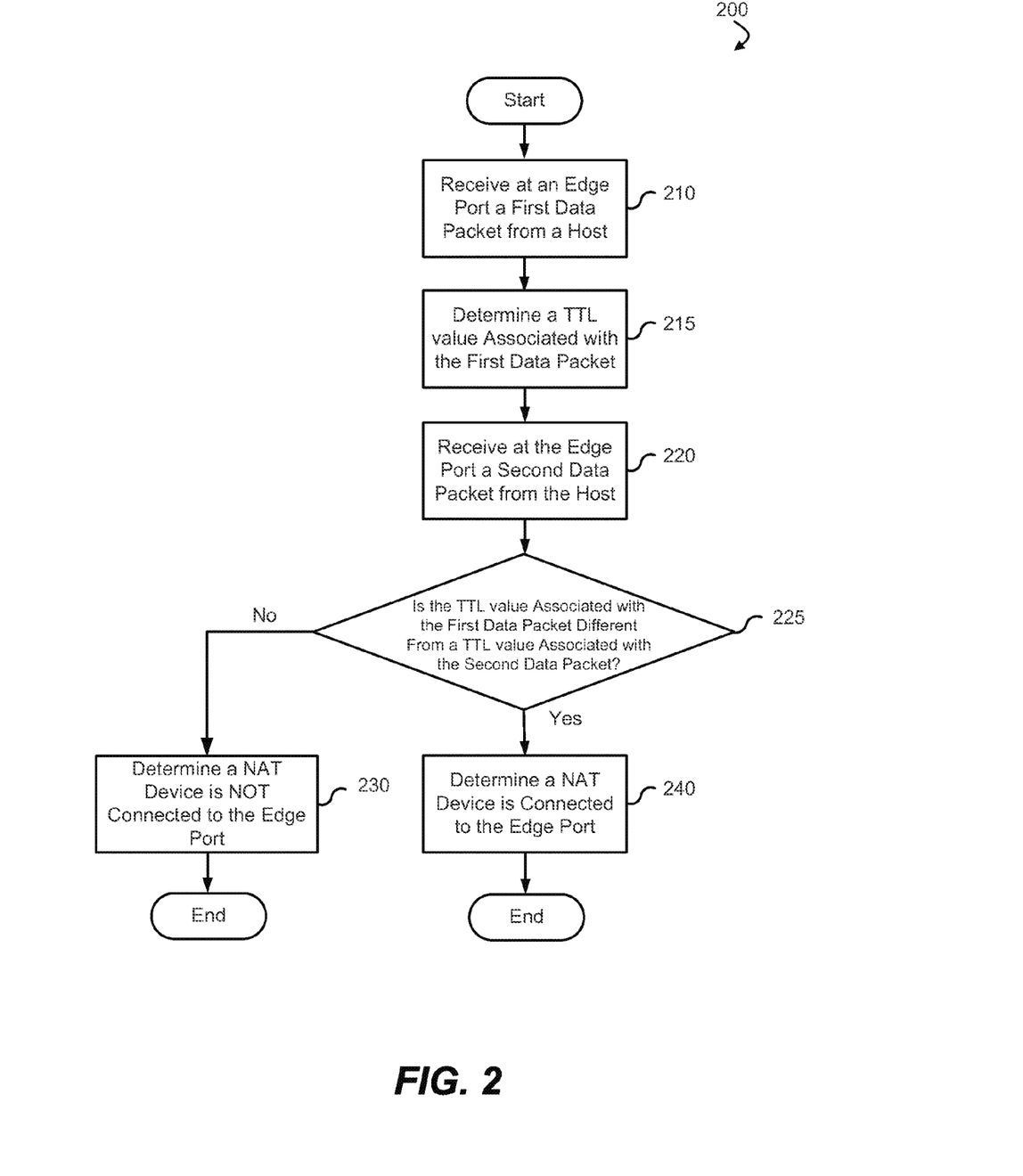
FIG. 2 is a process flow diagram for detection of a NAT device in accordance with an embodiment of the invention.

FIG. 2 is a process flow diagram for detection of a NAT device in accordance with an embodiment of the invention. The depicted process flow 200 is carried out by execution of one or more sequences of executable instructions. In another embodiment, the process flow 200 is carried out by execution of components of a network device, an arrangement of hardware logic, e.g., an Application-Specific Integrated Circuit (ASIC), etc.

NAT detection may be performed by a NAT detection module at an edge network device, such as network switch 10 and network switch 12, by analyzing a data packet and detecting an unauthorized NAT device in network system based on the analysis of the packet.

At step 210, the edge network device receives at an edge port a first data packet from a host connected to the edge port. At step 215, a time to live (TTL) value associated with the first data packet is determined. At step 220, a second data packet is received from the host connected to the edge port.

The second data packet may be analyzed to determine a TTL value associated therewith. At step 225, it is determined whether the TTL value associated with the first data packet is different from the TTL value associated with the second data packet.

An understanding of the behavior of a router can be leveraged to determine whether a NAT device is connected to the edge port of the edge network device. Typically, when traffic is forwarded by a router, the router may decrement the TTL value by one. As such, a variance in the TTL values of ingress packets arriving at the same edge port is a strong indication that a NAT device is connected to the edge port.

For example, the first data packet may have been sent by a host which was directly connected to the edge port. The first data packet may be correlated with a TTL value. The TTL value of the first packet may be recorded. If there is no NAT device connected to the same edge port, it can be expected that all TTL ingress should be the same. As such, any variance in the TLL values may indicate that a NAT is connected.

Furthermore, a variance of one may indicate that a NAT device has been added to the edge port. For example, the first data packet may have been sent by a host which was directly connected to the edge port. The first data packet may be correlated with a TTL value of 128. Subsequently, the NAT device receives from the same edge port the second data packet which is correlated with a TTL value of 127. The difference in the TTL values is one. Since a router typically decrements the TTL value of a packet traversing therefrom, a difference of one in the TTL values of the first and second data packets may indicate that a NAT router has been connected to the edge port.

In another example, the variance in the TTL values may indicate that there are multiple computers with different operating systems behind an edge port, A NAT device may be connected to a port. A host running a Mac OS® operating system is connected to the NAT device. A host running a Windows Vista® operating system is also connected to the NAT device. A TTL value is correlated with the computer operating system running on a host. The following table illustrates an exemplary correlation between the TTL values and computer operating systems:

TABLE 1

| Operating System | TTL Value |
| --- | --- |
| Windows Vista ®, Windows ® XP, Windows ® 2000, Windows NT ®, Windows ® 4.0 | 128 |
| Linux ® | 64 |
| Mac OS ® 10 | 64 |

In operation, the first data packet may be received from the host running the Mac OS® operating system and as such, may be correlated with a TTL value of 64. The second data packet may be received from the host running the Windows Vista® operating system and as such, may be correlated with a TTL value of 128, The TTL values of the first and second packets may be compared and a mismatch may be detected.

Where the TTL value associated with the first data packet is different from the TTL value associated with the second data packet, processing continues to step 240, where it is determined that a NAT device is connected to the edge port. On the other hand, where the TTL values are the same, processing continues to step 230, where it is determined that a NAT device is not connected to the edge port.

The presence of NAT devices may be detected at the network device quickly and efficiently. Since the data packets themselves are not modified, there is no additional delay in writing to the packets. Moreover, there is no need to track a history of TTL values, which could occupy a significant amount of memory on the network device. Instead, in one embodiment, the TTL value of the first ingress data packet is stored and is used to compare with TTL values of subsequent ingress data packets.

Figure 3:
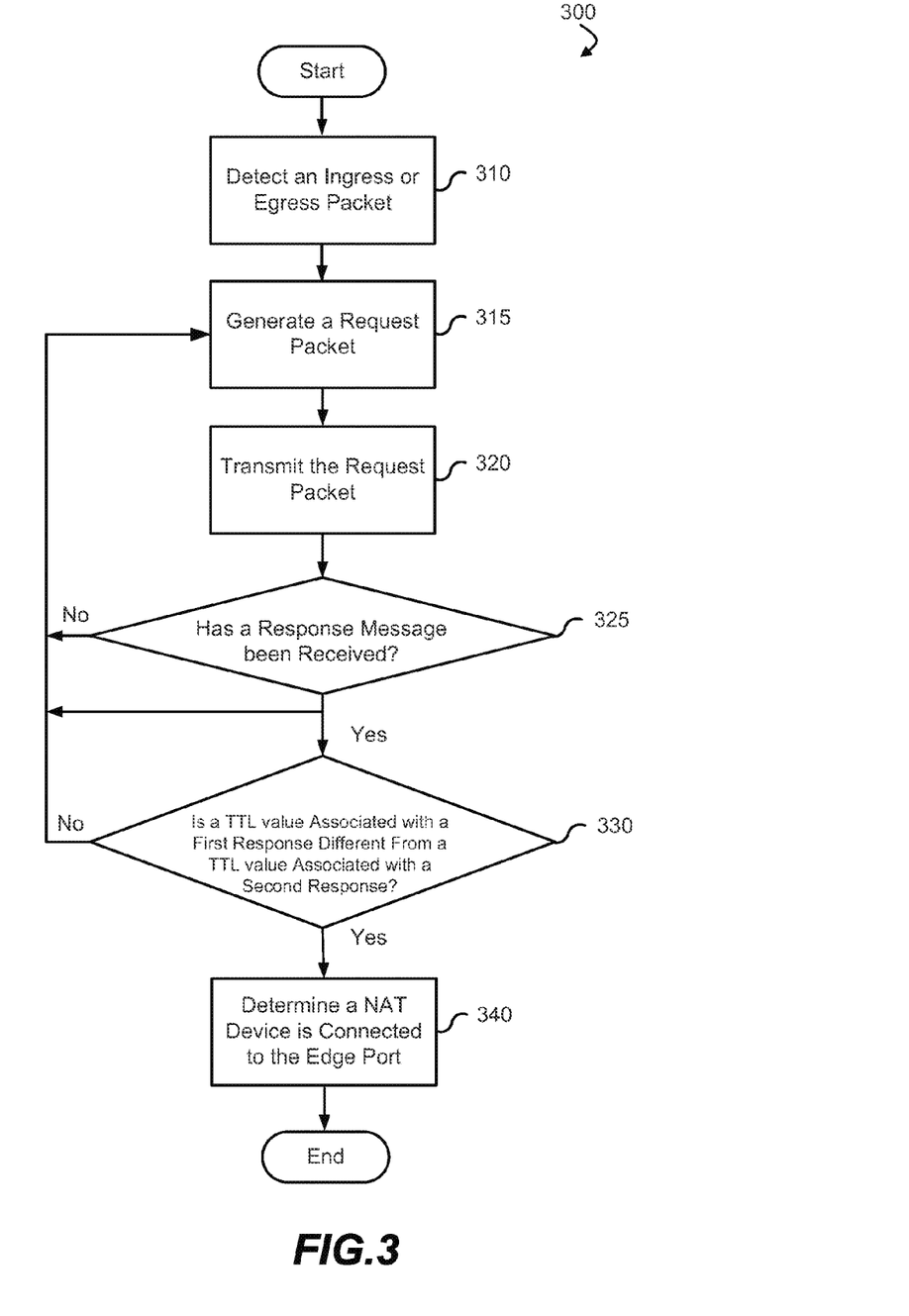
FIG. 3 is another process flow diagram for detection of a NAT device in accordance with an embodiment of the invention.

FIG. 3 is another process flow diagram for detection of a NAT device in accordance with an embodiment of the invention. The depicted process flow 300 is carried out by execution of one or more sequences of executable instructions. In another embodiment, the process flow 300 is carried out by execution of components of a network device, an arrangement of hardware logic, e.g., an Application-Specific Integrated Circuit (ASIC), etc.

NAT detection may be performed by a NAT detection module at an edge network device, such as network switch 10 and network switch 12, by analyzing a response packet, such as a SYN+ACK message, and detecting an unauthorized NAT device in network system based on the analysis of the packet. In particular, multiple hosts behind a NAT device are discovered by soliciting responses therefrom.

At step 310, the edge network device detects an ingress and/or egress packet. As used herein, ingress traffic is traffic that enters the edge network device through an edge port. Egress traffic is traffic that exits the edge network device through an edge port.

At step 315, a request packet is generated. The request packet is used to solicit a response from any hidden hosts. The request packet may be a transmission control protocol (TOP) packet, for example, such as a synchronization (SYN) message. In a typical TOP three-way handshake connection, a synchronization (SYN) message, a synchronization and acknowledgement (SYN+ACK) message, and an acknowledge (ACK) message are sent between a first host and a second host. When a SYN message is received by the receiving host, a response packet, such as the SYN+ACK message, is typically provided.

The destination address of the request packet is determined. Where an ingress packet is detected at step 310, the destination address of the request packet is set as the source address of the ingress packet. Where an egress packet is detected at step 310, the destination address of the request packet is set as the destination address of the egress packet.

The destination port of the request packet is determined. It is recognized that the multiplexing feature of the TCP/IP Protocol stack can allow a NAT device to maintain different connections with several hosts using different TOP or UDP ports. Each port field in the packet uses 16 bits, which means that there are a possible 65,536 ($2^{16}$) different port values. In one embodiment, each of these port values are checked to determine if a host is hidden there. The destination port may begin at a value that is 0-65,536 and may subsequently be incremented, decremented, or otherwise modified, for example until a response message is received with a TTL value that is different from that of an initial response message or until all port values have been exhausted.

At step 320, the request packet is transmitted. It is determined whether a response message to the request packet is received at the edge port, at step 325. In one embodiment, the response message, such as a SYN+ACK message, may be expected within a time frame. Where no such response is received, processing may loop back to step 315 where another request packet is generated with an incremented port value. Where the response is received at the edge port, and the response is an initial response, processing continues to step 315, where another request is generated with an incremented port value. Where the received response is not an initial response, processing continues to step 330, where TTL values of two responses received at the same edge port are compared. Step 330 may be logically similar to step 225 of FIG. 2.

The header of the response message includes a TTL value. At step 330, it is determined whether a TTL value associated with a first response is different from a TTL value associated with a second response. Variance in the TTL values may indicate the presence of a NAT router. In one embodiment, the TTL value of the first response message is stored and is used to compare with TTL values of subsequent response messages.

Where the TTL value associated with the first response message is different from the TTL value associated with the second response message, processing continues to step 340, where it is determined that a NAT device is connected to the edge port. On the other hand, where the TTL values are the same, processing continues to step 315, where yet another request packet is generated with an incremented port value. Where all of the port values, or any subset thereof, have been exhausted, it is determined that a NAT device is not connected to the edge port.

Figure 4:
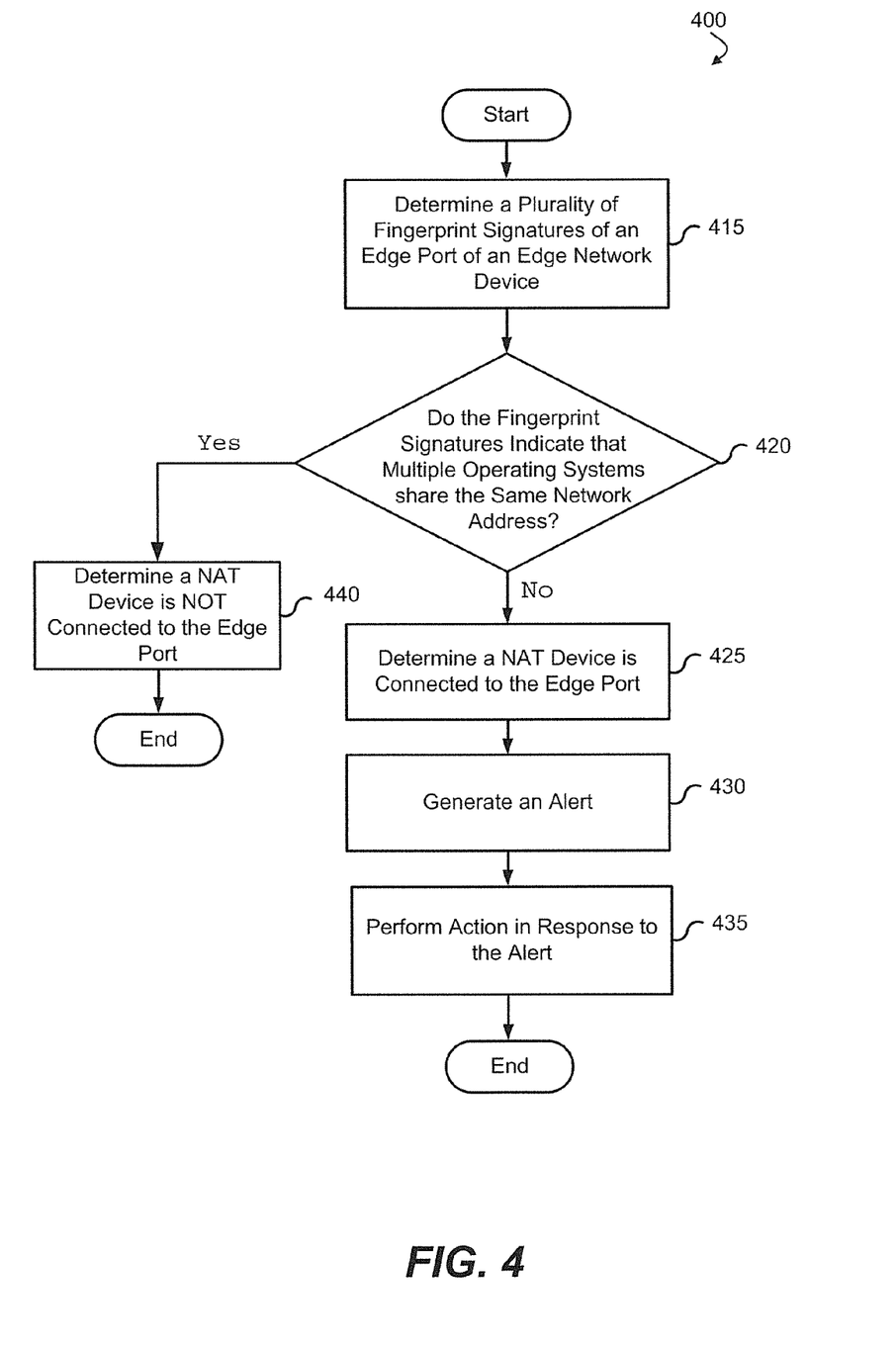
FIG. 4 is another process flow diagram for NAT detection based on fingerprint signatures in accordance with an embodiment of the invention.

FIG. 4 is another process flow diagram for NAT detection based on fingerprint signatures in accordance with an embodiment of the invention. The depicted process flow 400 is carried out by execution of one or more sequences of executable instructions. In another embodiment, the process flow 400 is carried out by execution of components of a network device, an arrangement of hardware logic, e.g., an Application-Specific Integrated Circuit (ASIC), etc.

NAT detection may be performed by a NAT detection module at a network management server, such as network management server 30, or at a network device by analyzing a plurality of operating system fingerprint signatures and detecting an unauthorized NAT device in network system based on the analysis of the fingerprint signatures.

At step 415, a plurality of fingerprint signatures of ingress packets of an edge port of an edge network device are determined. In one embodiment, the fingerprint signatures of ingress packets of the edge port may be collected or otherwise provided to the network management server. A data collection server may collect statistical sampling data of network traffic, for example from one or more network devices that are managed by network management server 30. A network management protocol may be implemented that enables traffic summary information (e.g., source address, destination address, timestamp, raw packet header information, or other statistical sampling data of network traffic) to be gathered. Examples of the network management protocol may include, but are not limited to, sFlow, NetFlow, remote monitoring (RMON), simple network management protocol (SNMP), and Extended RMON.

A fingerprint signature may be generated for each ingress traffic summary for an edge port of an edge network device. For example, fingerprinting tests are applied to the content of the ingress traffic summary to classify the operating system that produced the network traffic associated with the ingress traffic summary.

The ingress traffic summaries may be tested based on various factors, such as timestamp format, Internet Protocol Identification (IP ID) values, length of a packet, and other fields in layer 3 and layer 4 packet headers, such as a do not fragment (DF) field, type of service (TOS), TCP header length, window size, and the types of TCP options present in the header.

One operating system may apply a certain format to a timestamp of a data packet, whereas another operating system may apply another format. In other words, a particular format of a timestamp may be an identifier of a particular operating system. As such, the timestamp format of each packet represented in the traffic summary is determined.

Moreover, the IP ID values (i.e., sequence numbers) of the ingress traffic summaries of the edge port are compared to each other. The manner in which the IP ID values have been incremented may be an identifier of a particular operating system. For example, a Windows® operating system increments the IP ID values by 256 while a Solaris® operating system increments by one. As such, the incremental change in the IP ID values between packets represented in the traffic summaries are determined.

Additionally, a particular length of a packet may be an identifier of a particular operating system. For example, the lengths of synchronize (SYN) messages vary between operating systems. As such, the length of each packet represented in the traffic summaries are determined.

Furthermore, the transmission control protocol (TCP) options field may be an identifier of a particular operating system. As such, the TCP options of each packet represented in the traffic summaries are determined.

One or more these factors are considered in generating the fingerprint signature for each ingress traffic summary for the edge port of the edge network device. In another embodiment, the fingerprint signatures may be generated using passive and/or active fingerprinting methodologies.

At step 420, it is determined whether the fingerprint signatures indicate that multiple operating systems share the same network address. In one embodiment, a fingerprint signature is used to classify each of the traffic as being generated by a particular operating system. In other words, each fingerprint signature of the edge port may be mapped to an operating system.

Where the operating systems of the fingerprint signatures are the same, processing continues to step 440, and it is determined that a NAT device is not connected to the edge port. On the other hand, where multiple operating systems are identified for the fingerprint signatures for the same edge port, processing may continue to step 425 where it is determined that a NAT device is connected to the edge port.

At step 430, an alert is generated upon determining that a NAT device is connected to the edge port. The alert may indicate that multiple operating systems have been detected, and may include an identification of the location (i.e., edge network device identifier, edge port number, etc.) in the network where the multiple operating systems that share the same network address was detected. The alert may also include information such as an identification of each operating system detected and that a NAT router may be present.

At step 435, an action is performed in response to the alert. The action may include one or more of sending the alert to a local log file or to a network administrator, disabling the identified location in the network where it was detected that multiple operating systems share the same network address, or otherwise disabling access to the network by the NAT device, enable a timeout on the edge network device or edge port, etc.

Figure 5:
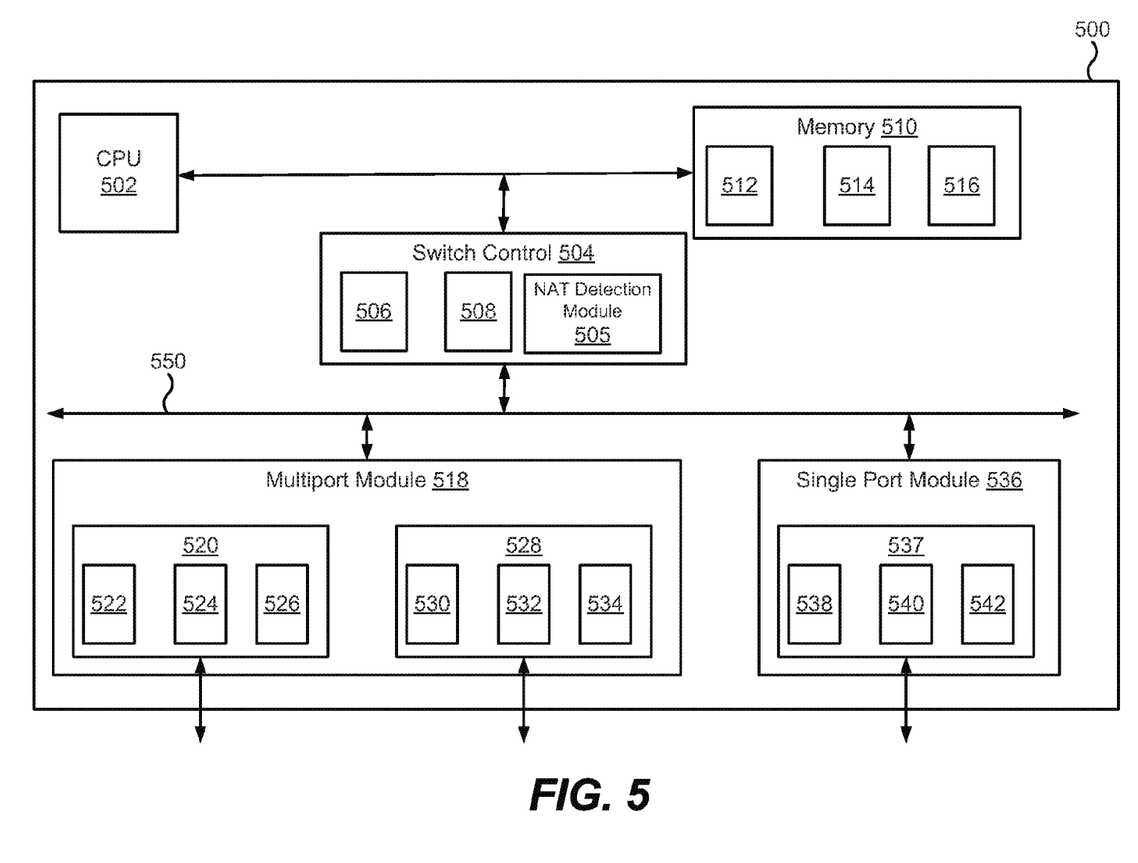
FIG. 5 is a block diagram of an exemplary packet switch in accordance with an embodiment of the invention.

FIG. 5 is a block diagram of an exemplary packet switch 500 in accordance with an embodiment of the invention. The specific configuration of packet switches used may vary depending on the specific implementation. A central processing unit (CPU) 502 performs overall configuration and control of the switch 500 in operation. The CPU 502 operates in cooperation with switch control 504, an application specific integrated circuit (ASIC) designed to assist CPU 502 in performing packet switching at high speeds.

The switch control 504 controls the "forwarding" of received packets to appropriate locations within the switch for further processing and/or for transmission out another switch port. Inbound and outbound high speed FIFOs (506 and 508, respectfully) are included with the switch control 504 for exchanging data over switch bus 552 with port modules. In accordance with an embodiment of the invention, the switch control 504 includes a NAT detection module 505 which is configured to detect the presence of a NAT device in a network.

Memory 510 includes a high and low priority inbound queue (512 and 514, respectively) and outbound queue 516. High priority inbound queue 512 is used to hold received switch control packets awaiting processing by CPU 502 while low priority inbound queue 514 holds other packets awaiting processing by CPU 502. Outbound queue 516 holds packets awaiting transmission to switch bus 550 via switch control 504 through its outbound FIFO 508. CPU 502, switch control 504 and memory 510 exchange information over processor bus 552 largely independent of activity on switch bus 550.

The ports of the switch may be embodied as plug-in modules that connect to switch bus 550. Each such module may be, for example, a multi-port module 518 having a plurality of ports in a single module or may be a single port module 536. A multi-port module provides an aggregate packet switch performance capable of handling a number of slower individual ports. For example, in one embodiment, both the single port module 536 and the multi-port module 518 may be configured to provide, for example, approximately 1 Gbit per second packet switching performance. The single port module 536 therefore can process packet switching on a single port at speeds up to 1 Gbit per second. The multi-port module 518 provides similar aggregate performance but distributes the bandwidth over, preferably, eight ports each operating at speeds, for example, of up to 100 Mbit per second. These aggregated or trunked ports may be seen as a single logical port to the switch.

Each port includes high speed FIFOs for exchanging data over its respective port. Specifically, each port, 520, 528, and 537, preferably includes an inbound FIFO 522, 530, and 538, respectively for receiving packets from the network medium connected to the port. Further, each port 520, 528, and 537, preferably includes a high priority outbound FIFO 524, 532, and 540, respectively, and a low priority outbound FIFO 526, 534, and 542, respectively. The low priority outbound FIFOs are used to queue data associated with transmission of normal packets while the high priority outbound FIFO is used to queue data associated with transmission of control packets. Each module (518 and 536) includes circuits (not specifically shown) to connect its port FIFOs to the switch bus 550.

As packets are received from a port, the packet data is applied to the switch bus 550 in such a manner as to permit monitoring of the packet data by switch control 504. In general, switch control 504 manages access to switch bus 550 by all port modules (i.e., 518 and 536). All port modules "listen" to packets as they are received and applied by a receiving port module to switch bus 550. If the packet is to be forwarded to another port, switch control 504 applies a trailer message to switch bus 550 following the end of the packet to identify which port should accept the received packet for forwarding to its associated network link.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage medium that are suitable for storing a program or programs that, when executed, for example by a processor, implement embodiments of the present invention. Accordingly, embodiments provide a program comprising code for implementing a system or method as claimed in any preceding claim and a machine readable storage medium storing such a program. Still further, embodiments of the present invention may be conveyed electronically via any medium such as a communication signal carried over a wired or wireless connection and embodiments suitably encompass the same.

Figure 6:
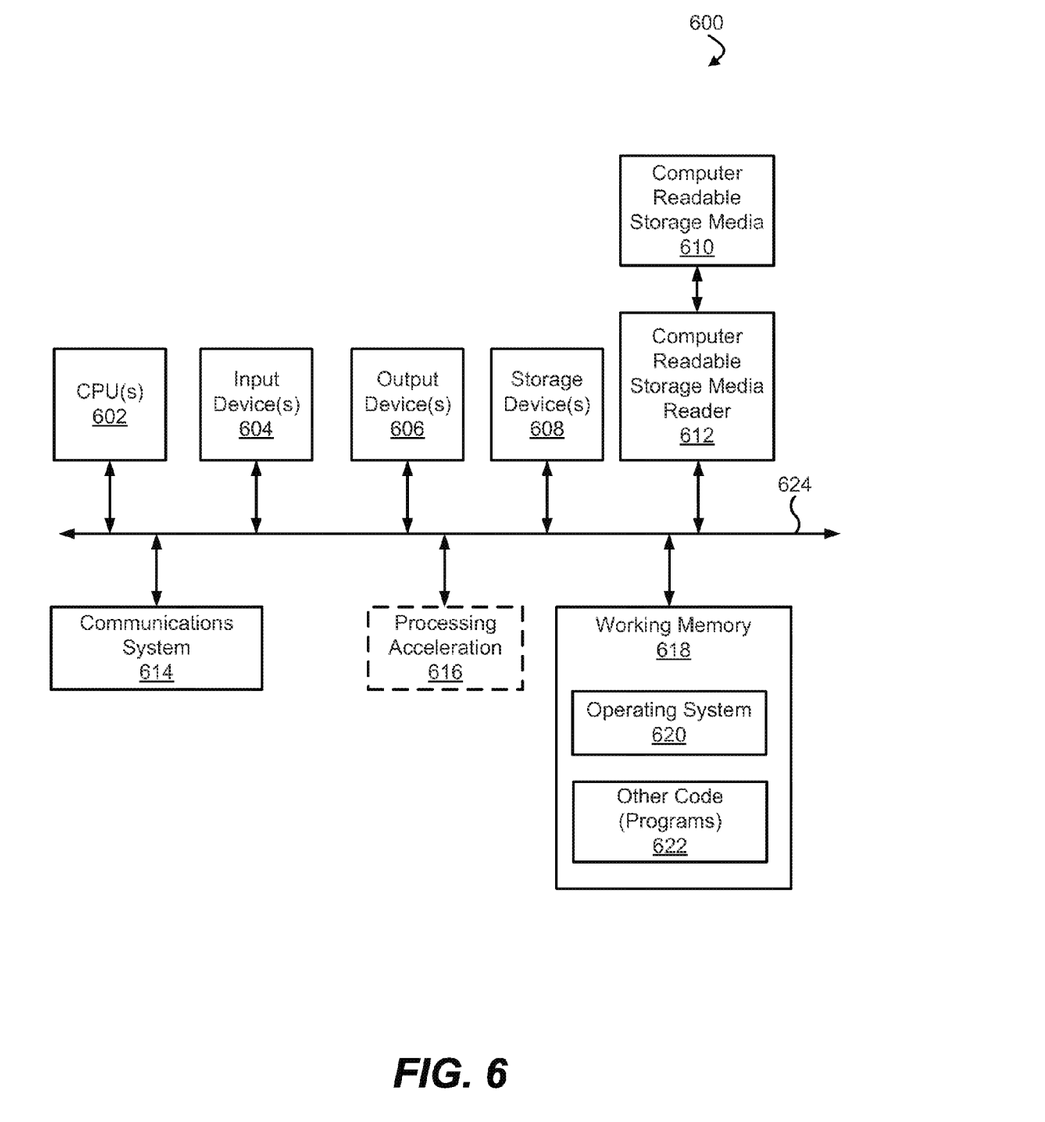
FIG. 6 illustrates an exemplary computer system in which various embodiments of the present invention may be implemented.

FIG. 6 illustrates an exemplary computer system 600 in which various embodiments of the present invention may be implemented. The system 600 may be used to implement any of the computer systems described above, such as the network management system. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and in combination with storage device(s) 608 in one embodiment) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for storing a plurality of instructions, or portions of instructions, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A system for detection of a network address translation (NAT) device in a network, the network including one or more hosts and an edge network device, the edge network device comprising:
   a processor; and a memory coupled to the processor, the memory to store an electronic document;

wherein the processor is to:

analyze a plurality of operating system fingerprint signatures of ingress packets at an edge port of the edge network device;

determine whether the plurality of fingerprint signatures indicate that multiple operating systems share a same network address at the edge port;

determine that a NAT device is connected to the edge port if the plurality of fingerprint signatures map to multiple operating systems; and determine that a NAT device is not connected to the edge port if the plurality of fingerprint signatures map to a single operating system.

2. The system of claim 1, wherein the plurality of fingerprint signatures are generated based on one or more of a format of a timestamp, an increment amount in a sequence number, a length of a packet, and a TCP options field.

3. The system of claim 1, wherein the processor is to generate an alert upon determining that a NAT device is connected to the edge port.

4. The system of claim 3, wherein the processor is to perform an action in response to the alert.

5. The system of claim 4, wherein the processor is to perform the action by blocking access to the network by the NAT device.

6. A method for detection of a network address translation (NAT) device in a network, the network including one or more hosts and an edge network device, the method comprising:

analyzing, by a processor, a plurality of operating system fingerprint signatures of ingress packets at an edge port of the edge network device;

determining, by the processor, whether the plurality of fingerprint signatures indicate that multiple operating systems share a same network address at the edge port;

determining, by the processor, that a NAT device is connected to the edge port if the plurality of fingerprint signatures map to multiple operating systems; and determining, by the processor, that a NAT device is not connected to the edge port if the plurality of fingerprint signatures map to a single operating system.

7. The method of claim 6, wherein the plurality of fingerprint signatures are generated based on one or more of a format of a timestamp, an increment amount in a sequence number, a length of a packet, and a TCP options field.

8. The method of claim 6, further comprising:

generating, by the processor, an alert upon determining that a NAT device is connected to the edge port.

9. A non-transitory computer-readable storage medium storing machine readable instructions, which when executed by a processor cause the processor to:

analyze a plurality of operating system fingerprint signatures of ingress packets at an edge port of an edge network device in a network;

determine whether the plurality of fingerprint signatures indicate that multiple operating systems share a same network address at the edge port;

determine that a network address translation (NAT) device is connected to the edge port if the plurality of fingerprint signatures map to multiple operating systems; and determine that a NAT device is not connected to the edge port if the plurality of fingerprint signatures map to a single operating system.

10. The non-transitory computer readable medium of claim 9, wherein the plurality of fingerprint signatures are generated based on one or more of a format of a timestamp, an increment amount in a sequence number, a length of a packet, and a TCP options field.

11. The non-transitory computer readable medium of claim 9, wherein the machine readable instructions further cause the processor to:

generate an alert upon determining that a NAT device is connected to the edge port.

* * * * *